(12) United States Patent
Kawai

(10) Patent No.: US 7,020,181 B2
(45) Date of Patent: Mar. 28, 2006

(54) CODE DIVISION MULTIPLE ACCESS RECEIVER

(75) Inventor: Hisashi Kawai, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 878 days.

(21) Appl. No.: 09/984,744

(22) Filed: Oct. 31, 2001

(65) Prior Publication Data

US 2002/0110182 A1 Aug. 15, 2002

(30) Foreign Application Priority Data

Feb. 15, 2001 (JP) .............................. P2001-038915

(51) Int. Cl.
*H04B 1/69* (2006.01)

(52) U.S. Cl. ............... 375/147; 375/295; 375/261; 370/342; 455/67

(58) Field of Classification Search ........... 375/147, 375/150, 295, 261; 455/67; 370/342
See application file for complete search history.

(56) References Cited

U.S. PATENT DOCUMENTS

| | | | |
|---|---|---|---|
| 5,982,763 A * | 11/1999 | Sato | 370/342 |
| 6,768,729 B1 * | 7/2004 | Ohsuge | 370/342 |
| 2001/0050950 A1 * | 12/2001 | Sato | 375/150 |
| 2002/0054649 A1 * | 5/2002 | Kokuryo et al. | 375/295 |
| 2002/0094782 A1 * | 7/2002 | Lin | 455/67.1 |
| 2004/0047330 A1 * | 3/2004 | Matsuno et al. | 370/342 |

FOREIGN PATENT DOCUMENTS

EP        1033824 A2 *  9/2000

* cited by examiner

*Primary Examiner*—Shuwang Liu
*Assistant Examiner*—Eva Zheng
(74) *Attorney, Agent, or Firm*—Jacobson Holman PLLC

(57) ABSTRACT

The present invention provides a code division multiple access receiver which can maintain the accuracy of the result of demodulation of a received signal at a good level without increasing the scale of circuits and the amount of computation.

In the code division multiple access receiver, a control section 14 outputs amplitude-adjusting signals corresponding to the reception level of a received base band signal to an amplitude-adjusting section 20, and the amplitude-adjusting section 20 performs bit operation processes for removing invalid bit data from the complex correlation results of the received base band signal based on the amplitude-adjusting signals.

6 Claims, 7 Drawing Sheets

RESULT OF COMPLEX
CORRELATION

OUTPUT FROM MULTIPLICATION
SECTION

OUTPUT FROM MULTIPLICATION
SECTION AFTER FOLDING

OPERATION OF LIMITER

FIG.7

| AMPLITUDE-ADJUSTING SIGNAL | POSITIONS OF BITS TO BE SELECTED |
|---|---|
| 1 | 25bit ~ 20bit |
| 2 | 24bit ~ 19bit |
| 4 | 23bit ~ 18bit |
| 8 | 22bit ~ 17bit |
|  | . . . |
| ⋮ | . . . |

CODE DIVISION MULTIPLE ACCESS RECEIVER

BACKGROUND OF THE INVENTION (i) Field of the Invention

The present invention relates to a receiver for code division multiple access communication and particularly to a code division multiple access receiver which can improve sensitivity to a received signal amplitude-adjusting signals.

(ii) Description of the Related Art

In recent years, code division multiple access (CDMA) communication system-based digital radio communication is widely used in portable telephones. In the code division multiple communication, a variety of spread codes are used to perform modulation and multiplex the communication, whereby a waste of frequency components can be prevented and the confidentiality of the communication can be maintained advantageously.

In a portable telephone terminal adopting the code division multiple communication system, a code division multiple access receiver for receiving and demodulating a received base band signal is used.

A description will be given to a conventional code division multiple access receiver with reference to FIGS. 4 to 6. FIG. 4 is a block diagram of a conventional code division multiple access receiver. The code division multiple access receiver of FIG. 4 adopts W-CDMA (Wideband Code Division Multiple Access) as a communication system and receives and demodulates a complex-spread and modulated radio signal.

A received base band signal received by an antenna (not shown) is separated into an in-phase component and a quadrature component (indicated as "I phase" and "Q phase" in FIG. 4, respectively; these terms will be used in subsequent drawings), and the in-phase component and the quadrature component are output to a matched filter section (indicated as "MF section" in FIG. 4) 41 and a correlator section 45.

Both components of the received base band signal are subjected to a complex correlation computation with a spread code output from a spread code-generating section 43 in the matched filter section 41, and the results of the correlation computations are output to an electric power-averaging section 42. The spread code output from the spread code-generating section 43 is the same as that used in demodulating the received base band signal.

The electric power-averaging section 42 performs electric power computations based on the correlation computation results output from the matched filter section 41 to determine electric power values, averages the electric power values, and outputs the obtained result of averaging the electric power values to a control section 44.

The control section 44 detects the timing at which the largest electric power value is obtained from the electric power average result and outputs a spread code output timing signal to the spread code-generating section 43 based on the detected timing. The spread code-generating section 43 generates a spread code based on the spread code output timing and outputs the spread code to the matched filter section 41 and the correlator section 45.

Meanwhile, in the correlator section 45, complex correlation computations of both components of the received base band signal and the spread code output from the spread code-generating section 43 are performed, and the result of the correlation computation for each component is output to a storage section 46.

Next, a description will be given to the constitution and operation of the correlator section 45. FIG. 5 is a block-diagram of the correlator section 45.

Of the received base band signal components input into the correlator section 45, the I phase is input into exclusive OR circuits 501 and 510 and the Q phase is input into exclusive OR circuits 502 and 509. Of the spread codes output from the spread code-generating section 43, the one for the I phase is input into the exclusive OR circuits 501 and 509 and the one for the Q phase is input into the exclusive OR circuits 502 and 510.

A computation is performed in each exclusive OR circuit, and the results of the computations in the exclusive OR circuits 501 and 502 are output to an adder 503 to be added. In the correlator section 45 of FIG. 5, either 1 or −1 is input as the spread signal for each component. Since the scale of the circuits increases when the complex correlation computations are performed accurately, the accuracy of the computation results is maintained to some degree by using the exclusive OR circuits in the computations between the received base band signal and the spread code for the purpose of preventing an increase in the scale of the circuits.

The result of the addition in the adder 503 is further subjected to cumulative addition with the result of integrating the output of the adder 503 which is stored in an F/F (Flip Flop) 506 via a selecting section 505, and an updated integration result is input into the F/F 506.

A tip timing clock is input into the F/F 506, and the F/F 506 outputs the stored integration result to the selecting section 505 based on the clock, thereby performing the cumulative addition. The selecting section 505 outputs the integration result output from the F/F 506 to the adder 504 when a symbol timing clock is not input and outputs 0 to the adder 504 when the symbol timing clock is input. According to such a constitution, the correlator 45 can perform the integration of the correlation computation result at each tip timing and discharge the integration result at each symbol timing.

The integration result output from the F/F 506 is also output to a selecting section 507. The selecting section 507 outputs the integration result to an F/F 508 when a symbol timing clock is not input and outputs 0 to the F/F 508 when the symbol timing clock is input.

The F/F 508 stores the largest integration result out of the integration results output from the selecting section 507 and outputs the stored integration result as the complex correlation result of the I phase until 0 is output from the selecting section 507, that is, for a period of one symbol time unit. The complex correlation result of the I phase is calculated according to the constitutions and operations of the above circuits shown in the upper portion of FIG. 5.

The complex correlation result of the Q phase is calculated according to the circuits shown in the lower portion of FIG. 5 in the same manner as in the case of the I phase.

FIG. 6 is a diagram showing the waveforms of the output signals in the correlator section 45. The waveforms of the integration discharge results output from the F/F 506 or 514 are shown in the middle portion of FIG. 6. In reality, the waveforms of integration discharges are expressed as a waveform increasing or decreasing in the form of a staircase per tip time unit. In this case, however, they are expressed as straight lines for brevity.

Meanwhile, the waveform of the complex correlation results output from the F/F 508 or 516 are shown in the lower portion of FIG. 6. It is clear from the waveform of the complex correlation results that the F/F 508 or 516 stores and outputs the largest integration discharge result out of the integration discharge results in the symbol timings (shown in the upper portion of FIG. 6).

As for the size of data processed in the correlator section 45 in FIG. 4, when the received base band signal is 16-bit data and the data rate is 7.5 Ksps (spread factor (SF)=512), for example, the correlator section 45 performs cumulative addition for 512 times per component per symbol and outputs a 25-bit complex correlation result as a result of the cumulative addition.

The complex correlation results of both components which are output from the correlator section 45 are output to the storage section 46. The storage section 46 stores the highest 16 bits of the complex correlation result of each component fixedly for a size of one frame.

The complex correlation results stored in the storage section 46 are further subjected to RAKE synthesis in a RAKE synthesis section 47, and the results of the RAKE synthesis are subjected to soft discrimination, Viterbi decoding and CRC checking in an error-correcting section 48 to correct errors and output the resulting data as demodulated data.

In the code division multiple access receiver of FIG. 4, the timing at which the electric power value of the correlation computation results of the received signal and the spread code is maximum, that is, synchronous timing, is detected in the matched filter section 41 and the electric power-averaging section 42 and reflected on the spread code output timing of the spread code-generating section 43, and modulation is performed through the correlation computations of the received signal and the spread code in the correlator section 45 and the RAKE synthesis.

However, the above conventional code division multiple access receiver has the problem that the accuracy of the demodulation process cannot be maintained at a good level.

When the level of a 16-bit received signal to reach the receiver is degraded to ¼ due to an environmental change in transmission lines, the highest 2 bits out of the highest 16 bits of the complex correlation result of each component which are stored in the storage section 46 become invalid. When the level of the received signal is degraded to ⅛, 1/16 or 1/32 for the same reason, the highest 3 bits, 4 bits or 5 bits of the complex correlation result become invalid, respectively. Thus, the conventional code division multiple access receiver has the problem that such degradation in the level of the received signal lowers the accuracy of the demodulation process in the RAKE synthesis section 47 and the error-correcting section 48.

Further, when the symbol rate of the received signal is doubled, the spread factor is reduced to half, so that the number of chips per symbol is reduced to half and the highest 1 bit of the integration result becomes invalid. Further, when degradation in the level of the received signal occurs, the number of invalid bits in the complex correlation result is increased, so that the accuracy of the demodulation process is further lowered.

As a method for decreasing the number of such invalid bits in the correlation result, a method can be mentioned in which all the 25 bits of the complex correlation result are stored in the storage section 46 and the 25-bit data are subjected to the demodulation process in the RAKE synthesis section 47 and the error-correcting section 48 to secure a valid data portion. However, when this method is used, the scales of circuits for storing the correlation results and for performing computations and the amount of computation are increased, so that the consumption of electric power increases.

SUMMARY OF THE INVENTION

The present invention has been developed under the above circumstances. It is an object of the present invention to provide a code division multiple access receiver which can maintain the accuracy of demodulation process of a received signal at a good level without increasing the scale of circuits and the amount of computation.

To solve the problems of the above prior art, a first aspect of the present invention is directed to a code division multiple access receiver which measures the reception level of a code division multiple-modulated received base band signal, outputs an amplitude-adjusting signal corresponding to the reception level and performs bit operation processes for removing invalid bit data from the correlation computation results of the received base band signal. The code division multiple access receiver can maintain the accuracy of demodulation process of a received signal at a good level without increasing the scale of circuits and the amount of computation.

Further, a second aspect of the present invention is directed to a code division multiple access receiver for demodulating a received base band signal which has been complex-spread and modulated, which comprises an amplitude-adjusting section which performs electric power computations based on the results of correlation computations of the in-phase component and quadrature component of the received base band signal and a spread signal corresponding to the in-phase component and quadrature component of the received base band signal, outputs an electric power value and performs bit operation processes for removing invalid bit data on the correlation computation results based on an input amplitude-adjusting signal, and a control section which measures the reception level of the received base band signal based on the electric power value and outputs an amplitude-adjusting signal corresponding to the reception level. The code division multiple access receiver can maintain the accuracy of demodulation process of a received signal at a good level without increasing the scale of circuits and the amount of computation.

Still further, a third aspect of the present invention is directed to a code division multiple access receiver which comprises an amplitude-adjusting section and a control section, wherein the amplitude-adjusting section compares a correlation computation result with a bit operation result, detects whether the bit operation result has an overflow or not and outputs the result of the detection to the control section when the overflow is detected, and the control section makes a correction based on the result of overflow detection so as to minimize the bit data to be removed in the amplitude-adjusting section. The too code division multiple access receiver can make a proper amplitude adjustment according to the reception level of a received signal and maintain the accuracy of the demodulation process of the received signal at a better level.

BRIEF DESCRIPTION OF THE DRAWINGS

FIG. 7 is a table showing the relationships between amplitude-adjusting signals and bit-selecting positions.

Figure 1:
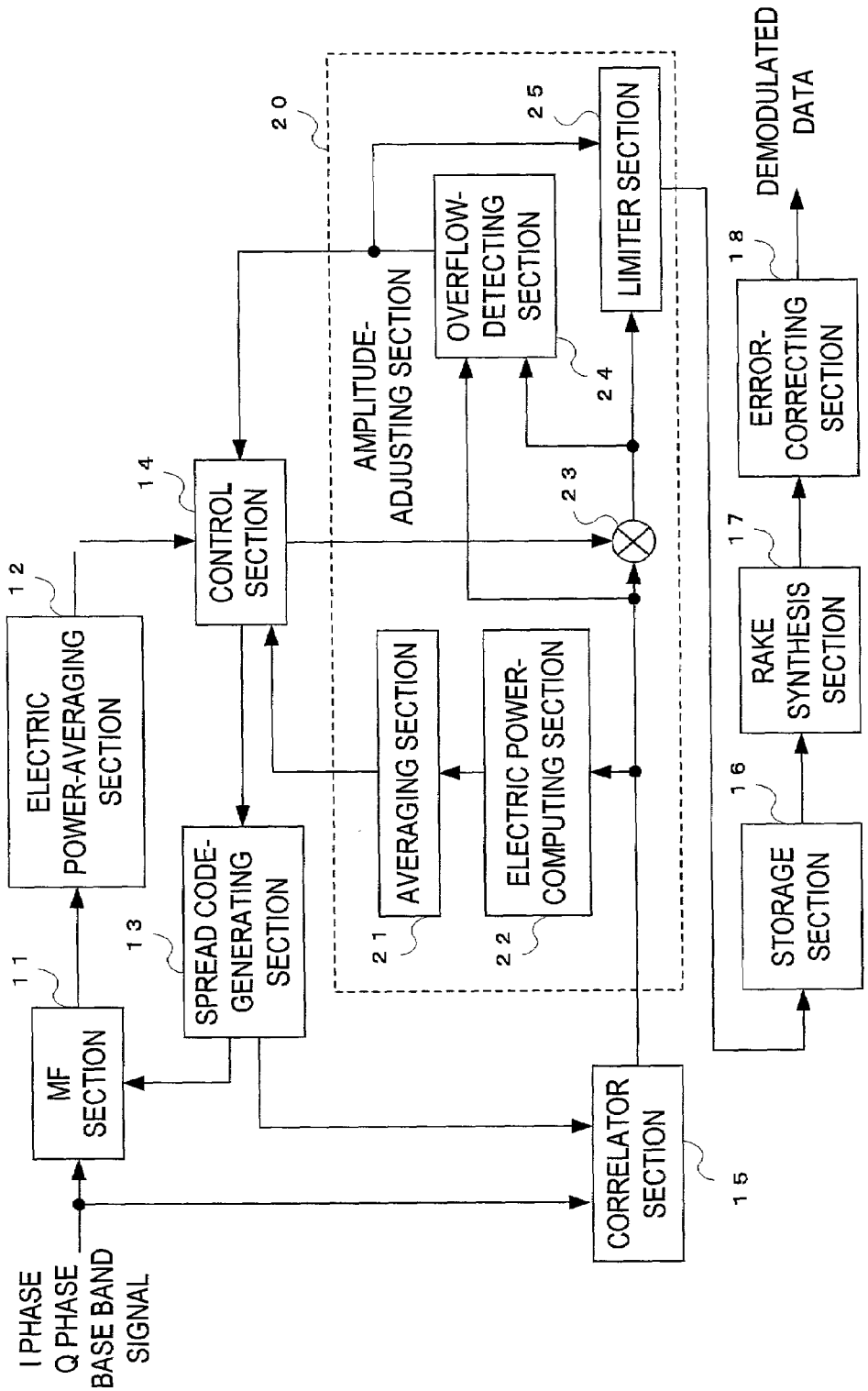
FIG. 1 is a block diagram of the code division multiple access receiver according to an embodiment of the present invention.

DESCRIPTION OF REFERENCE NUMERALS 11 and 41 denote matched filters; 12 and 42 electric power-averaging sections; 13 and 43 spread code-generating sections; 14 and 44 control sections; 15 and 45 correlator sections; 16 and 46 storage sections; 17 and 47 RAKE synthesis sections; 18 and 48 error-correcting sections; 20 an amplitude-adjusting section; 21 an averaging section; 22 an electric power-computing section; 23 a multiplication section; 24 an overflow-detecting section; 25 a limiter section; 501, 502, 509 and 510 exclusive OR circuits; 503, 504 and 512 adders; 505, 507, 513 and 515 selecting sections; 506, 508, 514 and 516 F/F; and 511 a subtracter.

DETAILED DESCRIPTION OF THE PREFERRED EMBODIMENT

A description will be given to an embodiment of the present invention with reference to the drawings.

The code division multiple access receiver according to the embodiment of the present invention comprises a control section which outputs an amplitude-adjusting signal corresponding to the reception level of a received base band signal and an amplitude-adjusting section which selects higher order bit positions in relation to the complex correlation computations of the received base band signal based on the amplitude-adjusting signal and performs bit operation processes for removing invalid bit data from the correlation computation results, whereby the accuracy of demodulation process of the received signal can be maintained at a good level without increasing the scale of circuits and the amount of computation.

A description will be given to the constitution of the code division multiple access receiver according to the embodiment of the present invention with reference to FIG. 1. FIG. 1 is a block diagram of the code division multiple access receiver according to the embodiment of the present invention. As in the case of the conventional code division multiple access receiver, the code division multiple access receiver of FIG. 1 also adopts W-CDMA as a communication system and receives and demodulates a complex-spread and modulated radio signal.

The code division multiple access receiver according to the embodiment-of the present invention comprises a matched filter section (indicated as "MF section" in FIG. 1) 11, an electric power-averaging section 12, a spread-code generating section 13, a control section 14, a correlator section 15, an amplitude-adjusting section 20, a storage section 16, a RAKE synthesis section 17 and an error-correcting section 18. Further, the amplitude adjusting section 20 comprises an averaging section 21, an electric power-computing section 22, a multiplication section 23, an overflow-detecting section 24 and a limiter section 25.

The matched filter section 11 performs complex correlation computations of the I phase and Q phase of a received base band signal received by an antenna (not shown) and a spread code output from the spread code-generating section 13 and outputs the results of the correlation computations to the electric power-averaging section 12.

The electric power-averaging section 12 performs electric power computations based on the correlation computation results output from the matched filter section 11 to determine electric power values, averages the electric power values, and outputs the obtained result of averaging the electric power values to the control section 14.

The matched filter section 11 outputs the correlation computation results at each tip timing, and the electric power averaging section 12 outputs the average electric power value based on this timing to the control section 14.

The spread code-generating section 13 generates the spread code used in demodulating the received base band signal for each component and outputs the spread codes to the matched filter section 11 and the correlator section 15. The timing at which the spread codes are output from the spread code-generating section 13 is determined based on a spread code to be output timing output from the control section 14 and described later. Further, the spread codes output from the spread code-generating section 13 are the same as that used in demodulating the received base band signal.

The control section 14 detects the timing at which the largest electric power value is obtained from the electric power average result output from the electric power averaging section 12 and outputs spread code output timing to the spread code-generating section 13 based on the detected timing.

Further, the control section 14 measures the reception level corresponding to the average electric power value output from the averaging section 21 of the amplitude-adjusting section 20 and outputs an amplitude-adjusting signal based on the result of the measurement to the multiplication section 23 for each component. Further, the control section 14 corrects and outputs the amplitude-adjusting signal based on the result of overflow detection output from the overflow-detecting section 24.

Figure 5:
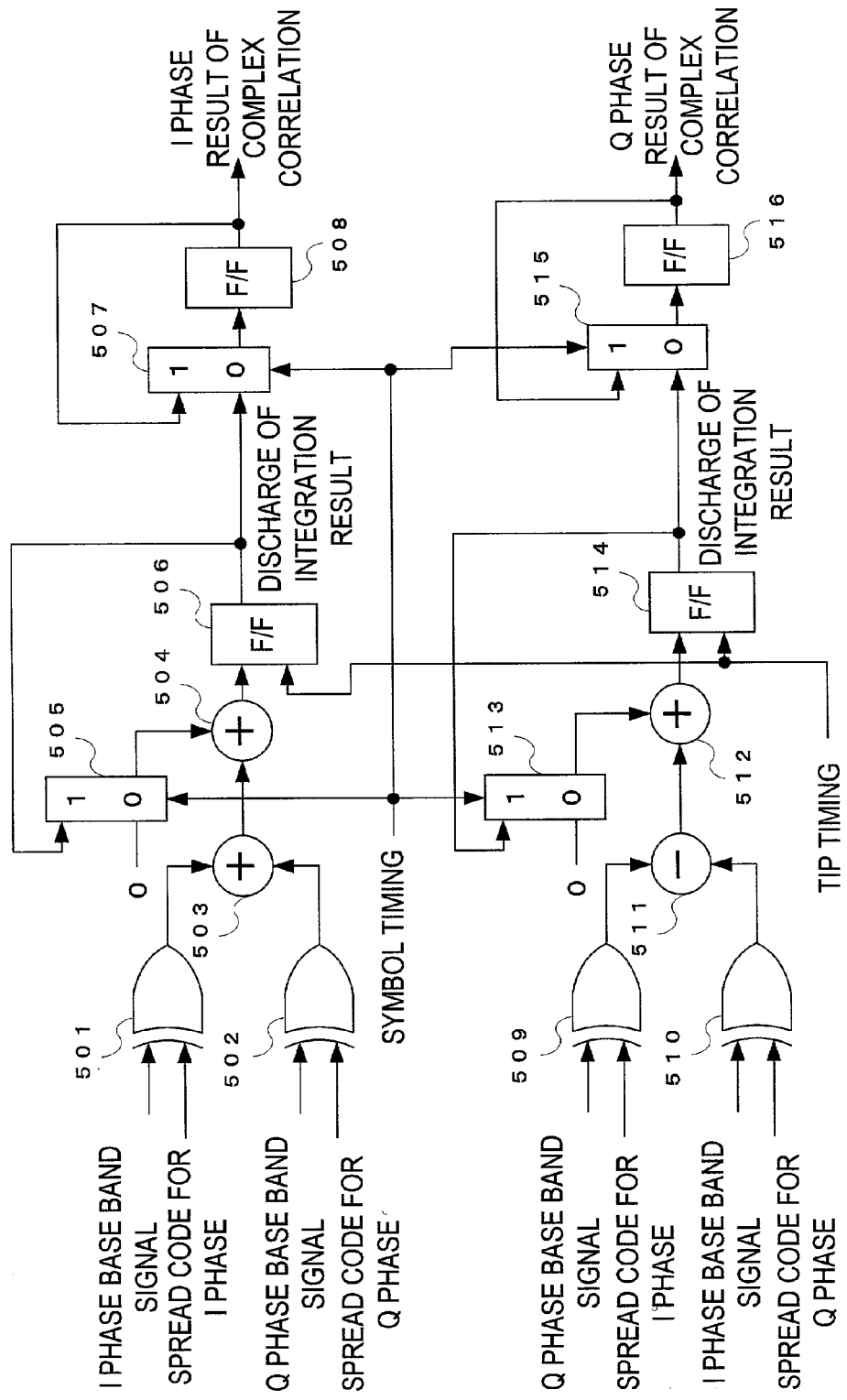
FIG. 5 is a block diagram of a correlator section.
Figure 6:
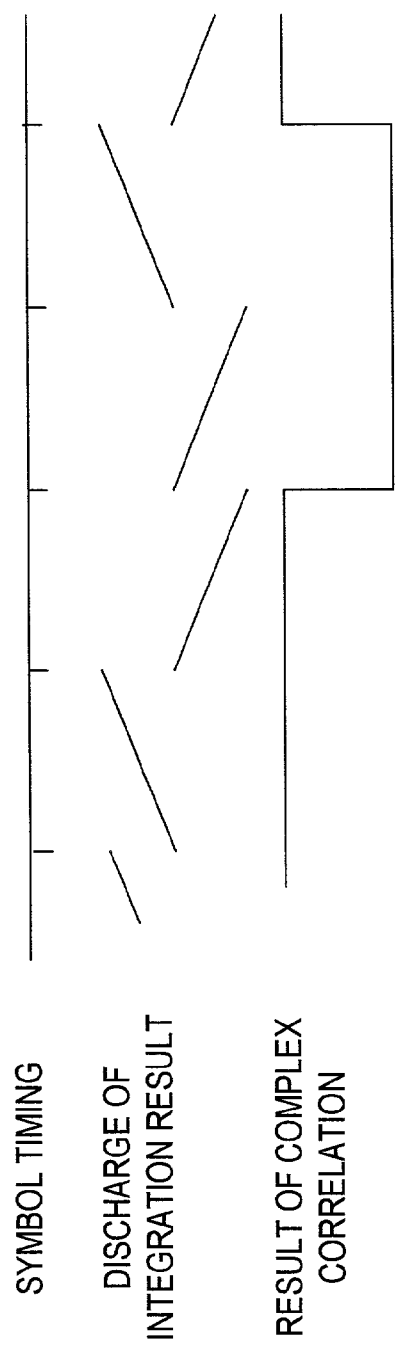
FIG. 6 is a diagram showing the waveforms of output signals in the correlator section.

The correlator section 15 performs complex correlation computations of the I phase and Q phase of the received base band signal and the spread code output from the spread code-generating section 13 and eventually outputs the correlation computation results at each symbol timing to the amplitude-adjusting section 20. The constitution of the correlator section 15 is the same as that of the correlator section 45 used in the conventional code division multiple access receiver shown in FIG. 5.

The electric power-computing section 22 in the amplitude-adjusting section 20 performs electric power computations based on the correlation computation results of both components which are output from the correlator section 15 to determine an electric power value for each of the components and outputs the electric power values to the averaging section 21.

The averaging section 21 averages the electric power values output from the electric power-computing section 22 to determine an average electric power value and outputs the average electric power value to the controller section 14. When the average electric power value is calculated in the averaging section 21 and reflected on the demodulation process, the receiver does not easily follow an abrupt change in electric power which is caused by a momentary change in transmission lines and can maintain the accuracy of the result of demodulation at a good level.

The multiplication section 23 performs bit operation processes on the correlation computation results of both components which are output from the correlator section 15 based on the amplitude-adjusting signals output from the control section 14 and outputs the results of the multiplications to the overflow-detecting section 24 and the limiter section 25.

The overflow-detecting section 24 carries out the detection of an overflow based on the correlation computation results of both components which are output from the correlator section 15 and the multiplication results of both components which are output from the multiplication section 23 and outputs the result of overflow detection to the limiter section 25 and the control section 14. When the overflow is detected, the overflow-detecting section 24 outputs the result of overflow detection together with such information as the position where the overflow is detected.

The limiter section 25 imposes a limit to the overflowed portions of the multiplication results based on the multiplication results of both components which are output from the multiplication section 23 and the overflow detection result output from the overflow-detecting section 24 and outputs the resulting multiplication results to the storage section 16.

The storage section 16 stores the highest 16 bits of the overflow-limited multiplication result of each component which is output from the limiter section 25, fixedly for a size of one frame.

The RAKE synthesis section 17 subjects the multiplication results stored in the storage section 16 to RAKE synthesis and outputs the results of the synthesis to the error-correcting section 18.

The error-correcting section 18 subjects the RAKE synthesis results output from the RAKE synthesis section 17 to soft discrimination, Viterbi decoding and CRC checking to correct errors and outputs the error-corrected RAKE synthesis results as demodulated data.

Next, a description will be given to the operation of the code division multiple access receiver according to the embodiment of the present invention with reference to FIGS. 1 and 2.

A received base band signal received by an antenna is separated into an in-phase component and a quadrature component (indicated as "I phase" and "Q phase" in FIG. 1, respectively; these terms will be used hereinafter), and the in-phase component and the quadrature component are output to the matched filter section 11 and the correlator section 15. Further, as in the case of the conventional code division multiple access receiver, the received base band signal is 16-bit data and is transmitted at a data rate of 7.5 Ksps.

The matched filter section 11 performs complex correlation computations of both components of the received base band signal and a spread code output from the spread code-generating section 13 and outputs the results of the correlation computations to the electric power-averaging section 12.

The electric power-averaging section 12 performs electric power computations to obtain electric power values from the correlation computation results output from the matched filter section 11, averages the electric power values, and outputs the obtained result of averaging the electric power values to the control section 14.

When the electric power average result is output from the electric power-averaging section 12, the control section 14 detects the timing at which the largest electric power value is obtained from the electric power average result and outputs a spread code output timing signal to the spread code-generating section 13 based on the detected timing. The spread code-generating section 13 generates a spread code for each component based on the spread code output timing and outputs the spread code to the matched filter section 11 and the correlator section 15.

In the code division multiple access receiver of FIG. 1, as in the case of the conventional code division multiple access receiver, the timing at which the electric power value of the correlation computation results of the received signal and the spread code is maximum, that is, synchronous timing, is detected in the matched filter section 11 and the electric power-averaging section 12 and reflected on the spread code output timing of the spread code-generating section 13, whereby the correlation computations can be performed at optimum timing.

Meanwhile, in the correlator section 15, complex correlation computations of both components of the received base band signal and the spread code output from the spread code-generating section 43 are performed, and the result of the correlation computation for each component at each symbol timing is output to the electric power-computing section 22 and the multiplication section 23 in the amplitude-adjusting section 20. A description will not be given to the operations of the complex correlation computations in the correlator section 15 since they are the same as those in the correlator section 45 of the conventional code division multiple access receiver.

The electric power-computing section 22 in the amplitude-adjusting section 20 performs an electric power computation based on the correlation computation results output from the correlator 15 to calculate an electric power value for each component and outputs the electric power values to the averaging section 21.

As for the complex correlation results output from the correlator section 15, since the correlations computations are performed on the radio signal which rotates on an IQ plane, that is, which is separated into the I component and the Q component and modulated, it is highly conceivable that there may occur a difference between the electric power levels of the components. Therefore, to obtain more accurate electric power values, the electric power-computing section 22 performs an electric power computation for each component and determines an electric power value.

The electric power values of each component which are output from the electric power-computing section 22 are averaged in the averaging section 21, and the average electric power value of each component which is obtained as a result of the averaging is output to the control section 14.

The control section 14 measures the reception level corresponding to the average electric power value of each component which is output from the averaging section 21 and outputs an amplitude-adjusting signal for each component based on the result of the measurement to the multiplication section 23.

When the average electric power value is compared with, for example, the electric power average result output from the electric power-averaging section 12 as the maximum value of the reception level measured in the control section 14 and the average electric power value is equal to the electric power average result, the control section 14 outputs 1 as the amplitude-adjusting signal. Similarly, the control go section 14 outputs 2 as the amplitude-adjusting signal when the average electric power value is equal to ½ of the maximum value and outputs 16 as the amplitude-adjusting signal when the average electric power value is equal to $\frac{1}{16}$ of the maximum value.

The multiplication section 23 performs bit operation processes on the correlation computation results of both components which are output from the correlator section 15 based on the amplitude-adjusting signal output from the control section 14 and outputs the results of the operations to the overflow-detecting section 24 and the limiter section 25.

In other words, in the multiplication section 23, a bit-shift operation (bit operation process) based on the amplitude-adjusting signal are conducted on the correlation computation results. For example, when the amplitude-adjusting signal is 1, it is assumed that the received base band signal has been received without degradation, and the correlation computation results can be used as they are since they contain no invalid data.

However, when a degraded base band signal is received, for example, when the average electric power value of the correlation computation result is ¼ of the maximum value, the highest 2 bits of the correlation computation result are considered invalid. The multiplication section 23 serves to remove invalid bid data caused by a decrease in electric power and extract only a valid correlation computation result.

To describe the bit-shift operation more specifically, the positions of the valid higher-order bits of the correlation computation result are specified and the bits are shifted to the left. For example, when the amplitude-adjusting signal is 1, since the correlation computation result contains no invalid data, the positions of the highest 6 valid bits of the correlation computation result are 25 to 20 bits. Meanwhile, when the amplitude-adjusting signal is 4, since the highest 2 bits are invalid, the positions of bits to be selected are 23 to 18 bits. The relationships between the amplitude-adjusting signal and the positions of bits to be selected are as shown in the table of FIG. 7.

The multiplication section 23 multiplies a valid correlation computation result, that is, a correlation computation result whose valid higher-order bits are specified, by the amplitude-adjusting signal to perform the left-shift operation. For example, when the amplitude-adjusting signal is 4, the multiplication section 23 multiplies the valid correlation computation result by 4 to perform the left-shift operation. The multiplication section 23 performs the above procedure on the correlation computation result of each component.

The multiplication results of both components which are output from the multiplication section 23 are output to the overflow-detecting section 24. The overflow-detecting section 24 detects an overflow in the multiplication results based on the multiplication results and the correlation output result of each component which is output from the correlator section 15 and outputs the results of overflow detection to the control section 14 and the limiter section 25.

The control section 14 changes the value of the current amplitude-adjusting signal to a smaller value and outputs a new amplitude-adjusting signal. The amplitudes of the correlation computation results which are excessively amplified in the multiplication section 23 can be properly controlled by the new amplitude-adjusting signal.

The limiter section 25 adjusts the overflowed portions of the computation results based on the computation results of both components which are output from the multiplication section 23 and the overflow detection results output from the overflow-detecting section 24.

A description will be given to the adjustments of the overflows in the limiter section 25 with reference to FIG. 2.

Figure 2A:
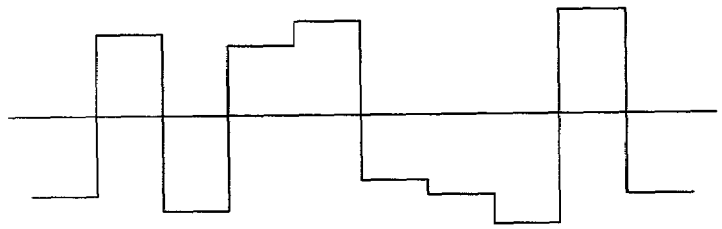
FIG. 2 is a diagram showing the waveforms of the outputs of the correlation computation result in each section of an amplitude-adjusting section.
Figure 2B:
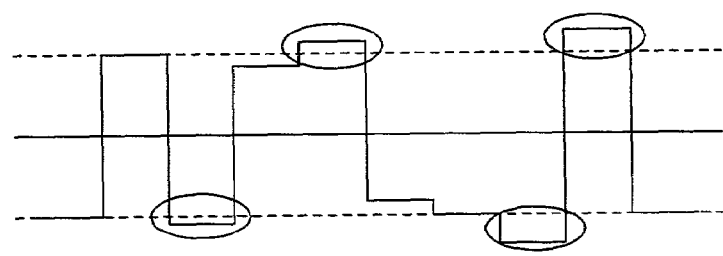

FIG. 2 is a diagram showing the waveforms of the outputs of the correlation computation result in each section of the amplitude-adjusting section 20, and FIG. 2A is a diagram showing the waveform of the correlation computation result output from the correlator section 15. It is assumed that the waveform of FIG. 2B is obtained after the bit-shift operation has been performed on this correlation computation result by the multiplication section 23. In FIG. 2B, the circled portions are overflowed portions. In reality, when overflows occur as a result of the bit-shift operation, overflowed portions are output such that the upper limits and the lower limits are folded inwardly and the folded portions are moved to the opposite sides as shown in FIG. 2C.

Figure 2C:
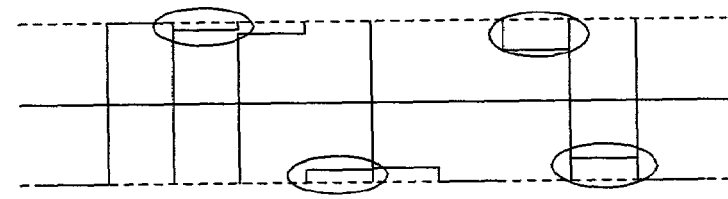
Figure 2D:
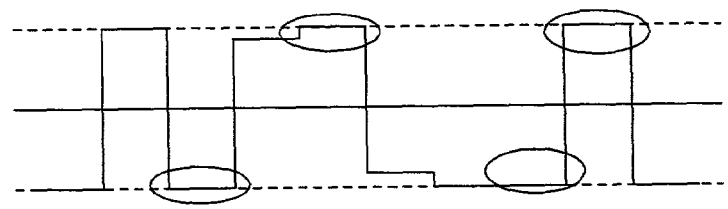

The limiter section 25 makes adjustments to the folded and output portions based on the multiplication result shown in FIG. 2C and the overflow detection results so that each overflowed portion becomes an upper limit or a lower limit. As a result of the adjustments made by the limiter section 25, the multiplication result becomes the waveform as shown in FIG. 2D. The limiter section 25 makes an overflow adjustment for each component and outputs the results to the storage section 16.

The storage section 16 stores the highest 16 bits of the complex correlation result of each component fixedly for a size of one frame.

The correlation computation results stored in the storage section 16 are further subjected to RAKE synthesis in the RAKE synthesis section 47, and the results of the RAKE synthesis are subjected to soft discrimination, Viterbi decoding and CRC checking in the error-correcting section 48 to correct errors and output the resulting data as demodulated data.

The code division multiple access receiver of FIG. 1, as in the case of the conventional code division multiple access receiver, modulation is performed through the correlation computations of the received signal and the spread code in the correlator section 45 and the RAKE synthesis. Since the amplitude-adjusting signal is output according to the reception level of the received signal in the control section 14 and the bit-shift operation and the overflow process are performed on the correlation results based on the amplitude-adjusting signal in the amplitude-adjusting section 20, invalid bit data in the correlation results which are caused by degradation in the received signal can be removed and the demodulation process can be carried out using valid correlation results.

Further, as in the case of the conventional code division multiple access receiver, since the demodulation process can be carried out by using only the highest 16 bits, the scales of the storage circuit and operation circuits for the correlation results in the receiver do not need to be expanded and the amount of computation does not increase, either.

FIG. 3 is a diagram showing other examples of the constitution of the amplitude-adjusting section in the code division multiple access receiver according to the embodiment of the present invention. FIG. 3A shows an example of an amplitude-adjusting section comprising the electric power-computing section 22 and the multiplication section 23. According to such a constitution, the reception level of a received base band signal can be measured and an amplitude-adjusting signal based on the reception level can be output, so that invalid bits of correlation computation results can be removed and the accuracy of the demodulation process of the received signal can be maintained at a good level.

Figure 3A:
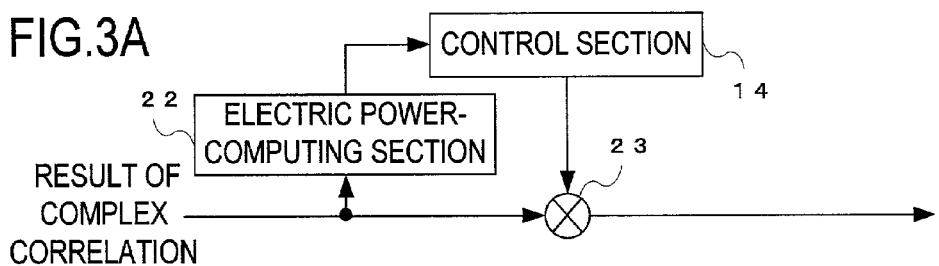
FIG. 3 is a diagram showing other examples of the constitution of the amplitude-adjusting section in the code division multiple access receiver according to the embodiment of the present invention.
Figure 3B:
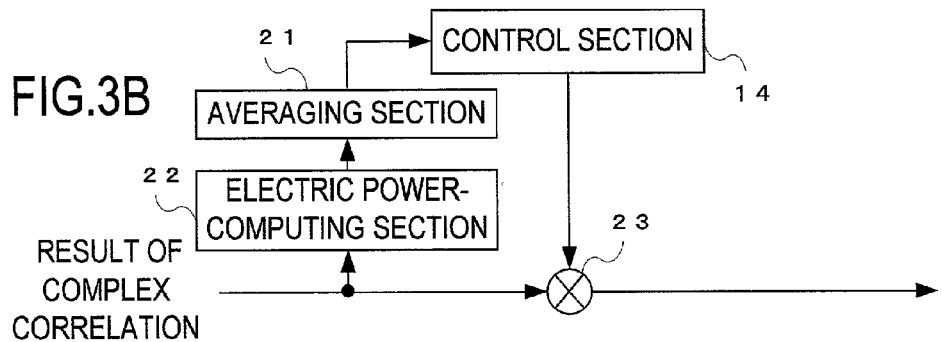

FIG. 3B shows the amplitude-adjusting section of FIG. 3A with the averaging section 21. According to such a constitution, the receiver can be prevented from easily following an abrupt change in electric power which is caused by a momentary change in transmission lines and the demodulation process can be carried out stably.

Figure 3C:
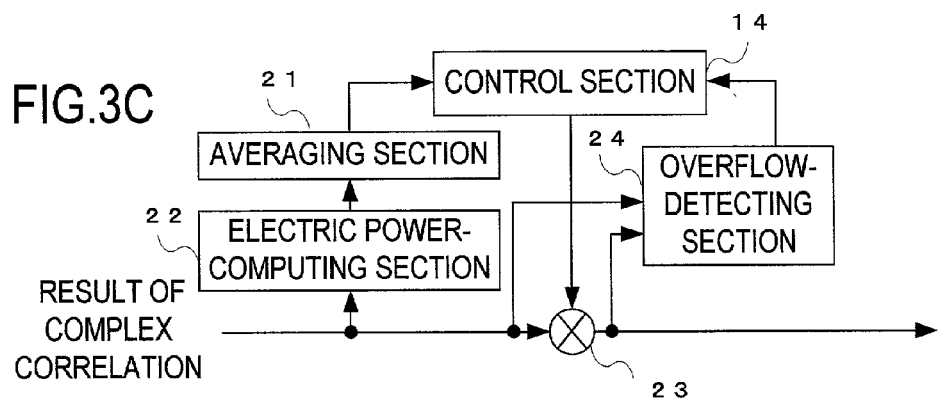

FIG. 3C shows the amplitude-adjusting section of FIG. 3B with the overflow-detecting section 24. According to such a constitution, the overflows caused by the multiplications of the correlation computation results can be detected, and the control section 14 can make proper amplitude adjustments to the received signal.

Figure 3D:
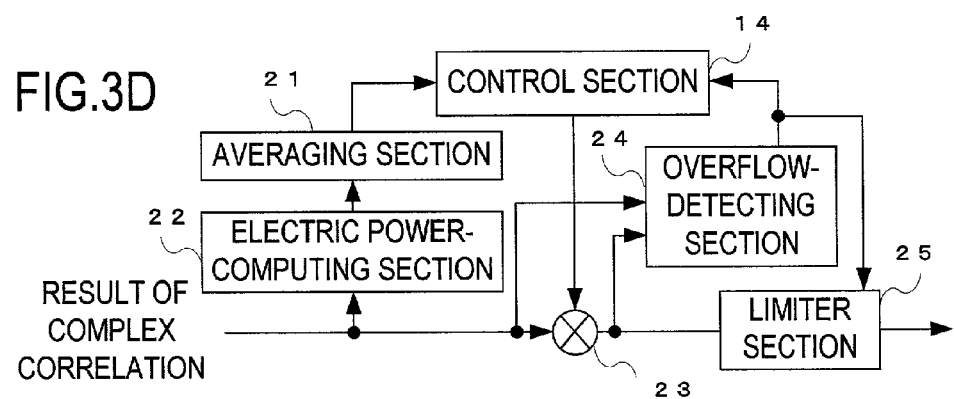
Figure 4:
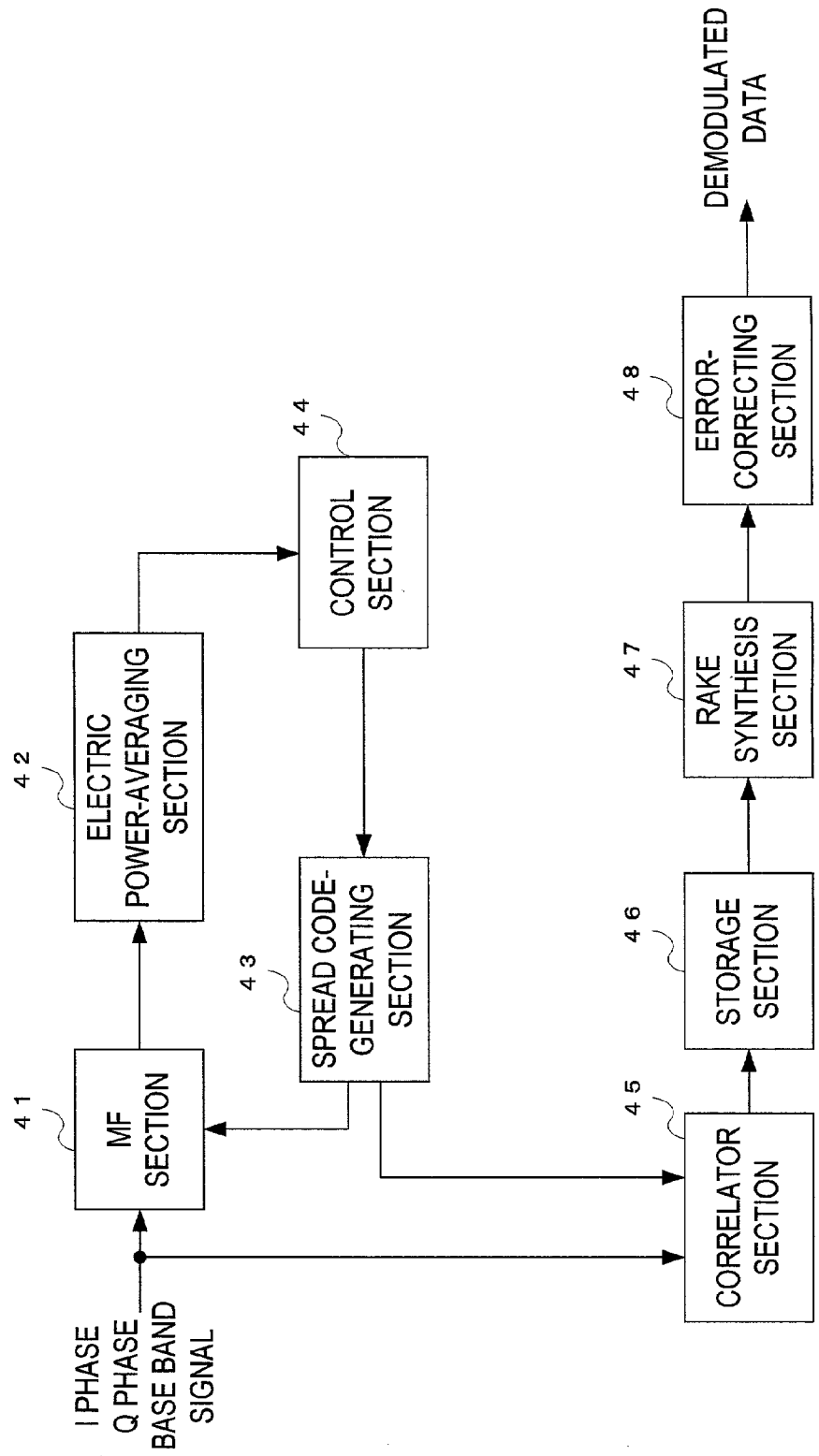
FIG. 4 is a block diagram of a conventional code division multiple access receiver.

FIG. 3D shows the amplitude-adjusting section of FIG. 3C with the limiter section 25. This amplitude-adjusting section is the same as the amplitude-adjusting section 20 of FIG. 1. According to such a constitution, folding of overflowed data portions can be prevented, and optimum multiplication results can be output.

It may be determined according to the scale or use of circuits which of the amplitude-adjusting sections whose constitutions are shown in FIG. 3 is to be used.

The code division multiple access receiver of FIG. 1 can obtain the same effect even when a matched filter is substituted for the correlator section 15 in consideration of the scale or use of circuits.

Further, the code division multiple access receiver of the present invention can be applied regardless of the type or number of spread codes.

As described above, according to the code division multiple access receiver according to the embodiment of the present invention, the amplitude-adjusting signals corresponding to the reception signal of the received signal are output from the control section 14 and the bit-sift operations are performed on the correlation results based on the amplitude-adjusting signals in the amplitude-adjusting section 20 to remove invalid data in the correlation results, so that the accuracy of the demodulation process of the received signal can be maintained at a good level without increasing the scale of circuits and the amount of computation.

Further, the amplitude-adjusting section 20 detects overflows from the correlation results and the bit-shifted correlation results and outputs the results of overflow detections if overflows are detected and the control section 14 corrects the amplitude-adjusting signals based on the overflow detection results so as to decrease the number of invalid bit data, so that proper amplitude adjustments can be made according to the reception level of the received base band signal and the accuracy of the demodulation process of the received signal can be maintained at a better level.

According to the present invention, the present invention is a code division multiple access receiver which measures the reception level of a code division multiple-modulated received base band signal, outputs amplitude-adjusting signals corresponding to the reception level and performs bit operation processes for removing invalid bit data from the correlation computation results of the received base band signal based on the amplitude-adjusting signals, so that the accuracy of the demodulation process of the received signal can be maintained at a good level without increasing the scale of circuits and the amount of computation.

Further, the present invention is a code division multiple access receiver for demodulating a received base band signal which has been complex-spread and modulated, which comprises an amplitude-adjusting section which performs electric power computations based on the results of correlation computations of the in-phase component and quadrature component of the received base band signal and spread signals corresponding to the in-phase component and quadrature component of the received base band signal, outputs electric power values and performs bit operation processes for removing invalid bit data on the correlation computation results based on input amplitude-adjusting signals, and a control section which measures the reception level of the received base band signal based on the electric power values and outputs amplitude-adjusting signals corresponding to the reception level, so that the accuracy of the demodulation process of the received signal can be maintained at a good level without increasing the scale of circuits and the amount of computation.

Still further, the present invention is a code division multiple access receiver which comprises an amplitude-adjusting section and a control section, wherein the amplitude-adjusting section compares a correlation computation result with a bit operation result to detect whether the bit operation result has an overflow or not and outputs the result of the detection to the control section when the overflow is detected, and the control section makes a correction based on the result of overflow detection so as to minimize the bit data to be removed in the amplitude-adjusting section, so that proper amplitude adjustments can be made according to the reception level of the received signal and the accuracy of the demodulation process of the received signal can be maintained at a better level.

What is claimed is:

1. A code division multiple access receiver for demodulating a complex-spread and demodulated received base band signal, the receiver comprising:

a spread code-generating section which generates spread codes for each component, a matched filter which performs complex correlation computations of an in-phase component and a quadrature component of a received base band signal and a spread code output from the spread code-generating section and outputs the results of the correlation computations, an electric power-averaging section which performs electric power computations based on the correlation computation results output from the matched filter to determine electric power values, averages the electric power values, and outputs an obtained result of averaging the electric power values as an electric power average result, a correlator section which performs complex correlation computations of the in-phase component and the quadrature component of the received base band signal and the spread code output from the spread code-generating section and outputs the results of the correlation computations for each component, an amplitude-adjusting section which performs electric power computations based on the results of correlation computations output from the correlator section to determine electric power values, averages the electric power values, outputs an average electric power values, and performs bit operation processes for removing invalid bit data on the correlation computation results output from the correlator section based on input amplitude-adjusting signals, and a control section which compares the average electric power values with the electric power average result as the maximum value of a reception level, calculates a ratio of the average electric power values to the electric power average result to measure a reception level of the received base band signal, and outputs amplitude-adjusting signals corresponding to the reception level.

2. The receiver of claim 1, wherein the amplitude-adjusting section comprises:

an electric power-computing section which performs electric power computations based on the correlation computation results of the in-phase component and the quadrature component and outputs an average electric power value corresponding to each component to the control section, and a multiplication section which performs the bit operation processes using the amplitude-adjusting signals output from the control section and the correlation computation results of both components.

3. The receiver of claim 1, wherein the amplitude-adjusting section comprises:
   an electric power-computing section which performs electric power computations based on the correlation computation results of the in-phase component and the quadrature component and outputs an electric power value corresponding to each component to the control section,
   an averaging section which averages the electric power values output from the electric power-computing section and outputs the obtained average electric power value to the control section, and
   a multiplication section which performs the bit operation processes using the amplitude-adjusting signals output from the control section and the correlation computation results of both components.

4. The receiver of claim 1, wherein the amplitude-adjusting section compares the correlation computation result with the bit operation result to detect whether the bit operation result has an overflow and outputs the result of the detection to the control section when the overflow is detected, and the control section makes a correction based on the result of the overflow detection so as to decrease bit data to be removed in the amplitude-adjusting section.

5. The receiver of claim 4, wherein the amplitude-adjusting section comprises:
   an electric power-computing section which performs electric power computations based on the correlation computation results of the in-phase component and the quadrature component and outputs an electric power value corresponding to each component to the control section,
   an averaging section which averages the electric power values output from the electric power-computing section and outputs the obtained average electric power value to the control section,
   a multiplication section which performs the bit operation processes using the amplitude-adjusting signals output from the control section and the correlation computation results of both components, and
   an overflow-detecting section which compares the correlation computation result with the bit operation result to detect whether the bit operation result has an overflow and outputs the result of the detection to the control section when the overflow is detected.

6. The receiver of claim 4, wherein the amplitude-adjusting section comprises:
   an electric power-computing section which performs electric power computations based on the correlation computation results of the in-phase component and the quadrature component and outputs an electric power value corresponding to each component to the control section,
   an averaging section which averages the electric power values output from the electric power-computing section and outputs the obtained average electric power value to the control section,
   a multiplication section which performs the bit operation processes using the amplitude-adjusting signals output from the control section and the correlation computation results of both components,
   an overflow-detecting section which compares the correlation computation result with the bit operation result to detect whether the bit operation result has an overflow and outputs the result of the detection when the overflow is detected, and
   a limiter section which makes an adjustment to the bit operation result in which the overflow is detected based on the detection result so that the overflow is set to be a predetermined upper or lower limit.

\* \* \* \* \*